United States Patent [19]

Malcolm et al.

[11] Patent Number: 5,562,829
[45] Date of Patent: Oct. 8, 1996

[54] PROCESS FOR CLARIFYING MILKHOUSE WASTEWATER

[75] Inventors: Ian Malcolm; Claude Weil; William Kollaard, all of Ottawa, Canada

[73] Assignee: Agricultural Research Institute of Ontario, Toronto, Canada

[21] Appl. No.: 526,211

[22] Filed: Sep. 11, 1995

Related U.S. Application Data

[63] Continuation-in-part of Ser. No. 257,487, Jun. 9, 1994, abandoned.
[51] Int. Cl.$^6$ ............................................. C02F 1/52
[52] U.S. Cl. .................. 210/667; 210/687; 210/712; 210/724; 210/906; 134/13; 134/22.13
[58] Field of Search ........................... 210/667, 687, 210/702, 708, 712, 724, 725, 906; 134/13, 22.13

[56] References Cited

U.S. PATENT DOCUMENTS

| | | | |
|---|---|---|---|
| 1,747,802 | 2/1930 | Travers . | |
| 2,420,340 | 5/1947 | Bymar | 210/23 |
| 3,575,852 | 4/1971 | Hughes | 210/667 |
| 4,061,568 | 12/1977 | Hall | 210/44 |
| 4,400,315 | 8/1983 | Thomas | 260/112 R |
| 4,956,093 | 9/1990 | Pirbazari | 210/616 |
| 5,409,617 | 4/1995 | Ross et al. | 210/762 |
| 5,514,282 | 5/1996 | Hibbard et al. | 210/652 |

FOREIGN PATENT DOCUMENTS

| | | |
|---|---|---|
| 0291556 | 11/1988 | European Pat. Off. . |
| 2351062 | 12/1977 | France . |
| 816399 | 7/1959 | United Kingdom .................. 210/928 |

*Primary Examiner—Peter A. Hruskoci*

[57] ABSTRACT

A process and apparatus are described for clarifying milkhouse wastewater, which is rich in phosphorus and also contains colloidal and suspended solids. This wastewater is obtained during the washing of milk pipelines of a dairy milking system. The wastewater is collected in a treatment vessel, with the ratio of suspended solids to phosphorus in the wastewater being lowered either before entering or while in the treatment vessel. To this wastewater of lowered suspended solids:phosphorus ratio, there is added sufficient calcium, preferably in the form of lime, to react with all of the phosphorus in the wastewater to form calcium hydroxyapatite precipitate. It has been discovered that, by lowering the ratio of suspended solids:phosphorus, sufficient calcium hydroxyapatite precipitate is formed to sweep with it during settling substantially all colloidal and suspended solids thereby leaving a clear, environmentally safe effluent water. The ratio of suspended solids:phosphorus is easily lowered by initially flushing the system with a small quantity of water and separately collecting this initial flush water having a high concentration of suspended solids.

11 Claims, 1 Drawing Sheet

PROCESS FOR CLARIFYING MILKHOUSE WASTEWATER

CROSS-REFERENCE TO RELATED APPLICATION

This application is a continuation-in-part of U.S. application Ser. No. 08/257,487, filed Jun. 9, 1994, now abandoned.

BACKGROUND OF THE INVENTION

This invention relates to a process for clarifying milkhouse wastewater by removing phosphorus and suspended solids therefrom.

Dairy cows are milked twice daily and in a tie stall operation, the cows are milked in a stable. A vacuum pump draws the milk from the stable into a milkhouse through a glass pipeline. The milk is collected in a refrigerated storage tank and held there until collected by a milk transport truck.

Prior to each milking, a sanitizer is rinsed through the milking equipment and pipeline. Following milking, water is rinsed through the system to remove the remaining milk. This is followed by a detergent rinse through the system and finally, an acid rinse is washed through the system to prevent buildup of milk stone. A typical sanitizer for this purpose is sodium hypochlorite, while a typical detergent contains sodium hydroxide and sodium hypochlorite. The acid rinse normally includes phosphoric acid and sulphuric acid.

Between 500 and 1,000 liters of milkhouse waste are discharged from an average dairy farm each day. On farms with liquid manure systems, this water is stored with the manure in a concrete or earthen storage facility and spread during the summer months. However, on farms where manure is handled as a solid, other means must be found for disposing of the large volumes of liquid discharged from the milkhouse.

An obvious answer to the disposal of milkhouse wastewater would seem to be a septic system. Such systems are relatively inexpensive, require little operator attention and eliminate the need for spreading large volumes of liquids. However, buried septic systems are commonly known to have failed after being loaded with milkhouse wastewater for less than two years. An oily mat forms between the crushed stone and the native soil in the trenches and eventually this mat may become impermeable and cause the wastewater to back up through the system onto the milkhouse floor.

A further problem with milkhouse wastewater is its high phosphorus content. Since phosphoric acid is usually part of the acid rinse washed through the system to prevent milk stone buildup, the effluent from the milkhouse may contain phosphorus in substantial concentrations, e.g. up to 100 mg/l or more. However, phosphorus concentrations in excess of about 0.03 mg/l in the milkhouse wastewater may cause prolific growth of algae in surface waters. As bacteria digest the algae, they use dissolved oxygen from the water.

DESCRIPTION OF THE PRIOR ART

It has been known to treat waste liquids discharged from creameries with treating mixtures which include hydrated lime, an electrolyte producing material and a coagulant. This is described in Travers, U.S. Pat. No. 1,747,802, issued Feb. 18, 1930.

Also, Thomas U.S. Pat. No. 4,400,315, issued Aug. 23, 1983 describes a method for removing phosphates from deproteinized cheese whey by treatment with a caustic, such as calcium hydroxide. Prior to the treatment with caustic, the pH of the whey is adjusted to between 6.4–7.0 and the temperature is raised to above 150° F.

There is still a great need for a milkhouse wastewater treatment system that can effectively remove both phosphorus and suspended solids, leaving a clear, environmentally safe effluent.

SUMMARY OF THE INVENTION

This invention relates to a process for clarifying wastewater having an environmentally unacceptable high phosphorus content and also containing colloidal and suspended solids, this wastewater being obtained during the washing of milk pipelines of a dairy milking system. The wastewater is collected in a treatment vessel, with the ratio of suspended solids to phosphorus in the wastewater being lowered either before entering or while in the treatment vessel. To this wastewater of lowered suspended solids:phosphorus ratio, there is added sufficient calcium, preferably in the form of lime, to react with all of the phosphorus in the wastewater to form calcium hydroxyapatite precipitate. It has been discovered that, by lowering the ratio of suspended solids:phosphorus, sufficient calcium hydroxyapatite precipitate is formed to sweep with it during settling substantially all colloidal and suspended solids thereby leaving a clear, environmentally safe effluent water.

Initial efforts to clarify milkhouse wastewater by simply adding lime were not successful. A floc was formed, but it did not remove all of the colloidal and suspended solids as it settled. However, it was surprisingly discovered that when the suspended solids:phosphorus ratio was dropped to a sufficiently low level, all of the colloidal and suspended solids were removed with the settling precipitate.

Although the reason for this surprising phenomenon is not entirely understood, it is believed that if all of the phosphorus in the wastewater is spent before enough precipitate is formed to remove all of the colloidal particles, then the water will not be clarified regardless how much lime is added. It is thought that the colloidal particles may be removed by the colloids being adsorbed onto the surface of precipitate particles. Thus, once the available surface area of the precipitate particles is exhausted, no more colloid removal is possible.

The ratio of suspended solids:phosphorus that is required is not a precisely defined value because of the variations in wastewaters being treated, temperature conditions etc. However, for most systems, a highly operable ratio of suspended solids:phosphorus is in the range of about 1 to 2:1. The preferred ratio for a particular milkhouse can be easily determined by some simple jar precipitation tests.

The lowering of the ratio of suspended solids:phosphorus in the milkhouse wastewater can be done either by removing suspended solids from the wastewater or by adding further phosphorus to the wastewater. Since phosphorus is not a desirable component, it would obviously be preferable to use a system which did not involve the addition of yet further phosphorus. On the other hand, there is a quite simple way of decreasing the amount of suspended solids. This involves initially flushing the system with a small amount of clean water after milking. Usually about 60 to 100 liters of clean water is used to flush out the system after milking and it has been found that a very large proportion of the suspended solids can be removed from the system either by collecting about the first 5 to 10 liters of water of the first circulation of this water, or by initially rinsing about 5 to 10 liters of water through the system before regular rinse cycles begin. This first 5 to 10 liters of rinse water passing through the system is separately collected and it contains a high concentration of suspended solids. The suspended solids in this initial rinse are typically milk solids and fats and this collected initial rinse is normally fed to calves. The above procedure will normally adjust the ratio of suspended solids to phosphorus to a level sufficiently low for complete clarification of the effluent wastewater simply by the addition of the lime. For instance, the wastewater collected without using an initial rinse will typically have a ratio of suspended solids:phosphorus in the range of 8–10:1. On the other hand, if a first rinse is removed as described above, the ratio typically drops to about 1–1.5:1.

The amount of lime that is used also varies depending on the milkhouse operation, but will typically be in the range of about 0.2 to 1.0 g/l. The preferred amount of lime used for a particular milkhouse can be easily determined by performing jar tests on a representative sample of the wastewater. After addition of the lime, the pH of the wastewater should be at least 9 and preferably at least 10.

It has been found that with the process of the present invention, it is an easy matter to remove more than 99% of the phosphorus contained in the wastewater while also removing 95 to 100% of suspended solids. The process is effective for treating wastewaters containing widely varying concentrations of phosphorus, e.g. concentrations as low as 20 mg/l and lower and as high as 100 mg/l and higher.

A further advantage of the present invention is that the clarified effluent water may in itself become a valuable component. It is not unusual for a farm to use up to 1,000 liters of water per day in a milkhouse and this can represent a substantial volume of water for a dairy. It is possible in accordance with the present invention to actually store the clarified effluent water and recycle it for re-use within the milkhouse operation.

In order to re-use the clarified effluent water, the calcium which it contains must be removed to prevent scale formation. This is best accomplished by passing the effluent water through a cation exchange resin operated in a sodium cycle, whereby the calcium ions are replaced with sodium ions. In this manner the recycle effluent water becomes a weak caustic solution consisting mostly of NaOH.

Some of the recycle effluent water with sodium hypochlorite added thereto is used as part or all of the sanitizer rinse prior to milking. Another part of this recycle effluent water with sodium hypochlorite added may be used in the detergent rinse after milking.

It is, of course, necessary to use fresh water to prepare the acid rinse as well as for the initial clean water flushing after milking, because of the high pH of the ion-exchanged recycle effluent water.

Allowing for the amount of fresh water needed for periodic back-washing on of the ion exchange resin, the overall reduction in fresh water use is almost 50% by use of the above recycle. The amount of detergent required is also reduced by recycling, while the amount of sanitizer required is increased. The result is an overall net saving in chemical costs together with the saving in fresh water.

The wastewater treatment according to the present invention can be carried out in a compact flocculator which can easily be incorporated into a milkhouse.

BRIEF DESCRIPTION OF THE DRAWINGS

In the drawings which illustrate certain preferred embodiments of the invention.

PREFERRED EMBODIMENTS OF THE INVENTION

Figure 1:
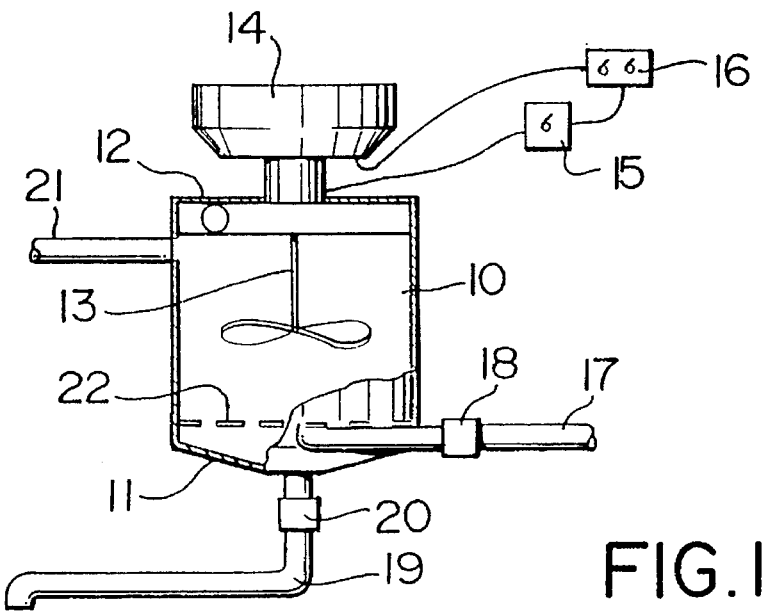
FIG. 1 is a schematic illustration of a flocculation reactor for carrying out the process of the invention.

As shown in FIG. 1, a cylindrical reactor vessel 10 has a partial conical bottom 11 and a closed top 12. An impeller 13 is mounted within the vessel and a chemical dispenser 14 is mounted on top of the vessel for dispensing lime.

The impeller 13 is driven by an electric motor powered via transformed 15 and connected to a timer 16. This timer 16 is also connected to the lime dispenser 14.

A discharge line 17 for clear effluent extends into the vessel 10 in a lower region with the inlet of this pipeline being positioned above line 22 which is the normal interface between clarified effluent and collected sludge. The clear effluent discharge line 17 also includes a valve 18. Extending from the central bottom region of the conical bottom 11 is a sludge discharge pipeline with a valve 20. Both valves 18 and 20 may also be connected to timer 16.

The various milkhouse effluents are pumped into reactor 10 through pipeline 21 and the system is then turned on. The required amount of lime is added by the dispenser 14 and the contents of the reactor are mixed for about 20 minutes. During this time coagulation and flocculation occur. The impeller is then turned off and the flocs are allowed to settle for two hours. At this point, valve 18 opens and the clarified effluent is discharged. Once the clarified effluent has been evacuated, valve 20 opens to discharge the sludge. The sludge can be included with solid or liquid manure. In a typical milkhouse operation, about 40 liters of sludge will be produced during each operation of the reactor.

Figure 2:
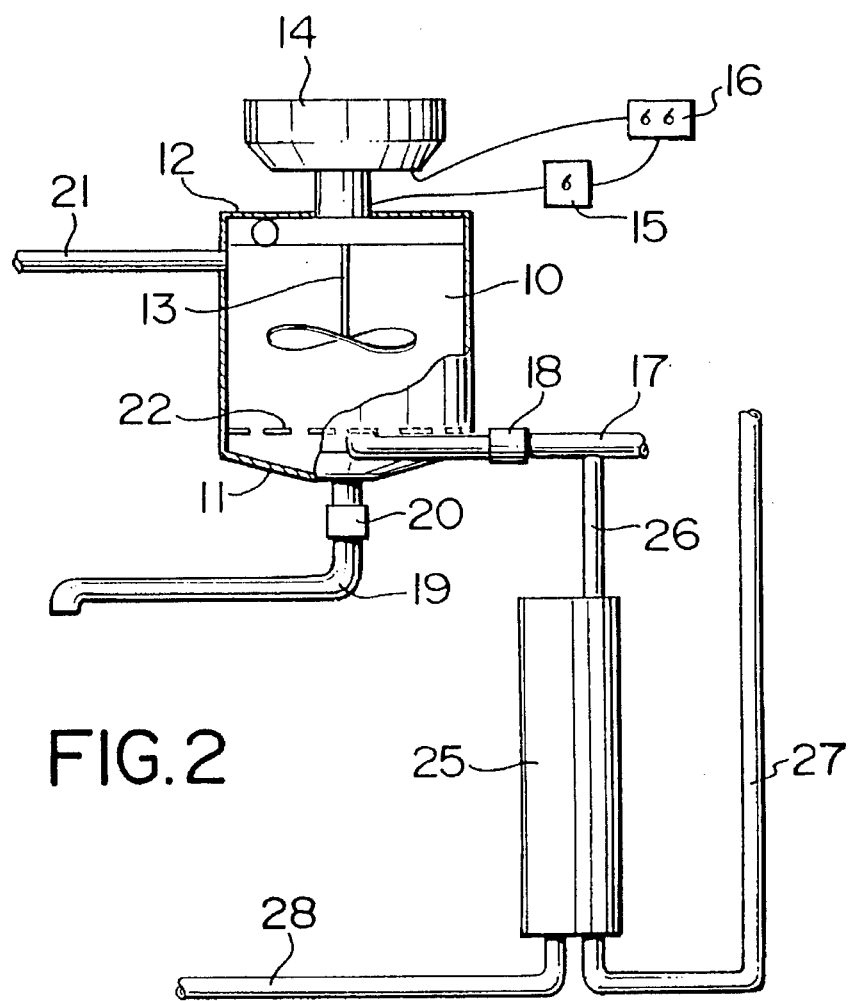
FIG. 2 is a schematic illustration of the reactor of FIG. 1 which includes a water recycle system.

FIG. 2 shows the addition of a recycle system for recycle of part or all of the clarified effluent discharged through line 17. The effluent to be recycled is drawn from effluent line 17 through line 26 into an ion exchange column 25 containing a cation exchange resin. A variety of commercially available cation exchange resins may be used, which are capable of replacing calcium ions by sodium ions. In operation, the clarified effluent being drawn in through line 26 contains calcium ions which are replaced by sodium ions in the ion exchange column 25. The product water from the column 25 is a weak caustic solution consisting mostly of NaOH and this stream is drawn off through line 27 for use in upstream operations. For instance, part of the effluent in line 27 may have sodium hypochlorite added thereto and be used as the sanitizer rinse prior to milking. Another part of this recycle effluent water in line 27 may have sodium hypochlorite added thereto and then used in the detergent rinse after milking.

The ion exchange column 25 is periodically backwashed with fresh water and the backwash effluent is discharged through line 28. It is also necessary to periodically regenerate the cation exchange resin and this is carried out in the usual manner using a concentrated brine solution. The effluent from the regeneration is also discharged through line 28.

This recycle system provides an overall reduction in the requirements of fresh water of almost 50%.

Example 1

A series of laboratory tests were conducted using a standard jar test apparatus. The test liquid was a milkhouse wastewater sample in which the ratio of suspended solids:phosphorus was adjusted to approximately 1:1.

Samples of the wastewater were held in 1 liter beakers and dosages of lime were added to each. The mixtures were stirred rapidly with impellers for a period of two minutes, then slowly for twenty minutes. Samples were syphoned from mid-depth of the clear zone of each vessel following one hour of settling. The supernatant in the jars was clear, colourless and odourless. The remaining suspended solids (TSS) were easily removed by filtration. The results of the tests are shown in Table 1 below.

TABLE 1

| | Jar Tests | | | | | | | | | | |
|---|---|---|---|---|---|---|---|---|---|---|---|
| Jar # | 1 | 2 | 3 | 4 | 5 | 6 | 7 | 8 | 9 | 10 | 11 |
| Lime Dose g/l | 0 | 0.1 | 0.2 | 0.3 | 0.4 | 0.5 | 0.6 | 0.7 | 0.8 | 0.9 | 1 |
| Temperature °C. | 4 | 4 | 4 | 4 | 4 | 4 | 4 | 4 | 4 | 4 | 4 |
| pH | 7.0 | 8.2 | 9.3 | 9.7 | 10.3 | 10.7 | 11.1 | 11.3 | 11.5 | 11.6 | 11.8 |
| Turbidity NTU | 64 | 18 | 7 | 2.2 | 2.8 | 2.6 | 2 | 1.6 | 1.4 | 1.5 | 1.1 |
| Calcium mg/l | 294 | 210 | 146 | 48 | 28 | 24 | 124 | 170 | 264 | 376 | 503 |
| TP mg/l | 79 | 20 | 4.1 | 2.0 | 0.8 | 0.5 | 0.4 | 0.3 | 0.3 | 0.3 | 0.3 |
| TSS mg/l | 83 | 5 | <1 | <1 | 1 | 3 | 3 | <1 | 3 | 1 | 1 |
| TS mg/l | 1686 | 1389 | 1314 | 1266 | 1288 | 1300 | 1352 | 1368 | 1396 | 1560 | 1604 |
| Sulphate mg/l | 277 | 294 | 271 | 272 | 279 | 301 | 298 | 291 | 297 | 311 | 3 |
| Chloride mg/l | 324 | 324 | 315 | 307 | 315 | 307 | 306 | 315 | 311 | 306 | 315 |

Example 2

A further test was carried out using the flocculator as shown in FIG. 1. The results obtained are shown in Table 2 below.

TABLE 2

| | Full Scale Tests | | | |
|---|---|---|---|---|
| Sample | Influent #1 | Effluent #1 | Influent #2 | Effluent #2 |
| pH | 6.4 | 11.1 | 6.31 | 6.58 |
| Turbidity (NTU) | 100 | 1.8 | 100 | 4.4 |
| Calcium (mg/l) | | 86 | 264 | 200 |
| TP (mg/l) | | 1.4 | 112 | 9.2 |
| TSS (mg/l) | 144 | 4 | 144 | 16 |
| TS (mg/l) | 1092 | 1484 | 1248 | 1764 |

We claim:

1. A process for clarifying wastewater having an environmentally unacceptable high phosphorus content and also containing colloidal and suspended solids, said wastewater being obtained during the washing of milk pipelines of a dairy milking system, which comprises collecting the wastewater in a treatment vessel, lowering the ratio of suspended solids to phosphorus in the wastewater either before entering or while in the treatment vessel, adding to the wastewater of lowered suspended solids:phosphorus ratio sufficient calcium to react with all of the phosphorus in the wastewater to form calcium hydroxy-apatite precipitate and raise the pH of the wastewater to at least 9, the lowered ratio of suspended solids to phosphorus being such that sufficient calcium hydroxyapatite precipitate is formed to sweep with it during settling substantially all colloidal and suspended solids and allowing the precipitate to settle thereby providing a clear, environmentally safe effluent water.

2. A process according to claim 1 wherein the suspended solids:phosphorus ratio is lowered by initially flushing the system with up to about 10 liters of water and collecting this initial flush water containing a major proportion of the suspended solids contained in the system.

3. A process according to claim 2 wherein the collected initial flush water contains milk solids and fats.

4. A process according to claim 1 wherein the wastewater in the treatment vessel contains a sanitizer which has been rinsed through the system prior to milking, a detergent rinsed through the system after milking and an acid rinsed through the system after the detergent.

5. A process according to claim 4 wherein the sanitizer contains sodium hypochlorite, the detergent contains sodium hydroxide and sodium hypochlorite and the acid includes phosphoric acid.

6. A process according to claim 1 wherein the calcium is added to the wastewater in the form of lime.

7. A process according to claim 6 wherein the lime is added in an amount of about 0.2 to 1.0 g/l.

8. A process according to claim 1 wherein the clear, environmentally safe effluent water is stored and re-used in the dairy milking system.

9. A process according to claim 1 wherein at least part of the clear, environmentally safe effluent water recovered is passed through a cation exchange resin to convert calcium ions in the water to sodium ions.

10. A process according to claim 9 wherein part of the effluent water containing sodium ions has sodium hypochlorite added thereto and is used as a sanitizer rinse prior to milking.

11. A process according to claim 9 wherein part of the effluent water containing sodium ions has sodium hypochlorite added thereto and is used as part of a detergent rinse after milking.

* * * * *